United States Patent [19]

Hirai et al.

[11] 4,194,155
[45] Mar. 18, 1980

[54] RADIO RECEIVING DEVICE FOR AUTOMOTIVE USE

[75] Inventors: Kazuo Hirai, Tokyo; Junich Kamata, Miyoshi; Sadao Makiguchi, Tokyo; Kazuhiro Iwai, Hidaka, all of Japan

[73] Assignee: Honda Giken Kogyo Kabushiki Kaisha, Tokyo, Japan

[21] Appl. No.: 916,047

[22] Filed: Jun. 14, 1978

[51] Int. Cl.² .............................................. H04B 1/06
[52] U.S. Cl. .................................. 455/345; 455/154; 455/351; 334/51
[58] Field of Search ............... 325/15, 16, 111, 117, 325/312, 361, 455, 352; D12/192; D14/75; 180/90; 334/47, 49, 50, 51

[56] References Cited

U.S. PATENT DOCUMENTS 3,071,728   1/1963   Grace et al. ................... 325/312

FOREIGN PATENT DOCUMENTS 59131   2/1931   Australia ................................ 325/312
1476801   3/1967   France .................................. 325/312

OTHER PUBLICATIONS

Flavoradios, Radio Shack–Allied Catalog #225m, July 1972, p. 26.

Primary Examiner—Robert L. Griffin
Assistant Examiner—Tommy P. Chin
Attorney, Agent, or Firm—Haseltine, Lake & Waters

[57] ABSTRACT

A portion of the instrument panel which is adjacent to the steering wheel is protruded and in which portion a radio receiving device is fitted which includes station-number and frequency indicator means and control means for station selection and frequency adjustment. The indicator means are arranged in the front face of the protruded panel portion so as to enable the driver readily to take the indicator readings without the need of shifting his line of sight to any substantial extent. The control means are arranged in the protruded panel portion sidewise thereof, including, among others, a single control knob arranged in a position to be readily reached by the driver's hand for controlling operation.

7 Claims, 9 Drawing Figures

RADIO RECEIVING DEVICE FOR AUTOMOTIVE USE

BACKGROUND AND SUMMARY OF THE INVENTION

This invention relates to radio receiving devices of the kind installed in the driver's seat of an automobile or other vehicle.

Heretofore, it has been common practice with radio receiving devices of the kind described to form a cavity in the instrument panel a at an appropriate location thereon in front of the driver's seat to accommodate a radio receiver b of the push button or other type, for example, as illustrated in FIG. 1 in the accompanying drawings. According to this practice, however, the radio receiver b has usually been in a position substantially spaced from the steering wheel c and this has unavoidably involved considerable trouble on the driver's part for radio controlling operation as his hand normally resting on the steering wheel c must be stretched therefrom sidewise a substantial distance to the radio receiver.

It is a primary object of the present invention to provide a radio receiving device of the kind described which is free from the inconvenience previously encountered as described above.

According to the present invention, there is provided a radio receiving device which comprises a portion of the instrument panel in front of the driver's seat which is protruded in the vicinity of the steering shaft of the vehicle, and control and indicator means arranged respectively on a side face and the front face of the protruded portion of the instrument panel.

Another object of the present invention is to provide a radio receiving device for automotive use of the character described which is provided with control means including a single control shaft to serve the dual function of selecting radio stations and setting on the frequency indicator the receiving frequency assigned to each of the radio stations selected.

The above and other objects, features and advantages will become apparent from the following description when taken in conjunction with the accompanying drawings, which illustrate a preferred embodiment of the invention.

DESCRIPTION OF THE PREFERRED EMBODIMENT

Figure 1:
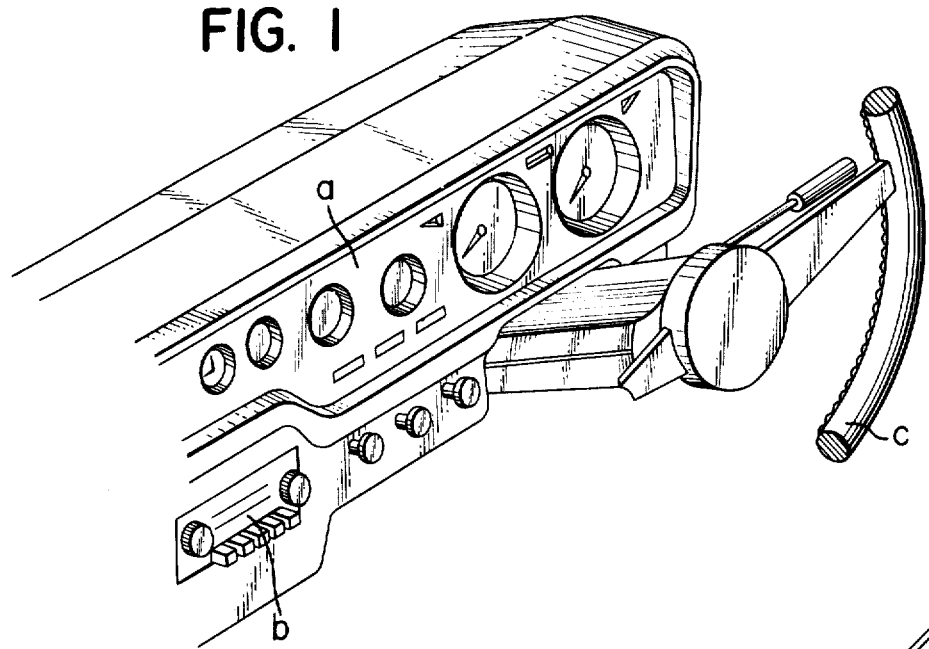
FIG. 1 is a fragmentary oblique view showing a conventional arrangement of a radio receiving device for automotive use which is mounted in the front panel of the vehicle.
Figure 2:
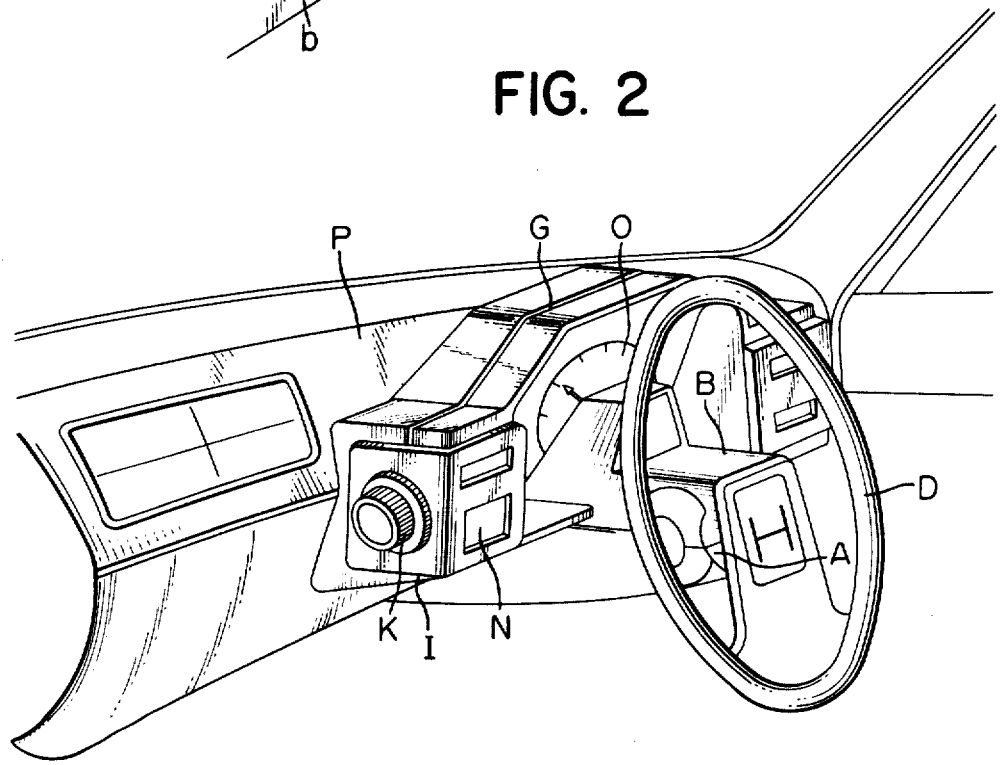
FIG. 2 is a view similar to FIG. 1, illustrating the arrangement of a radio receiving device for automotive use which embodies the present invention.
Figure 3:
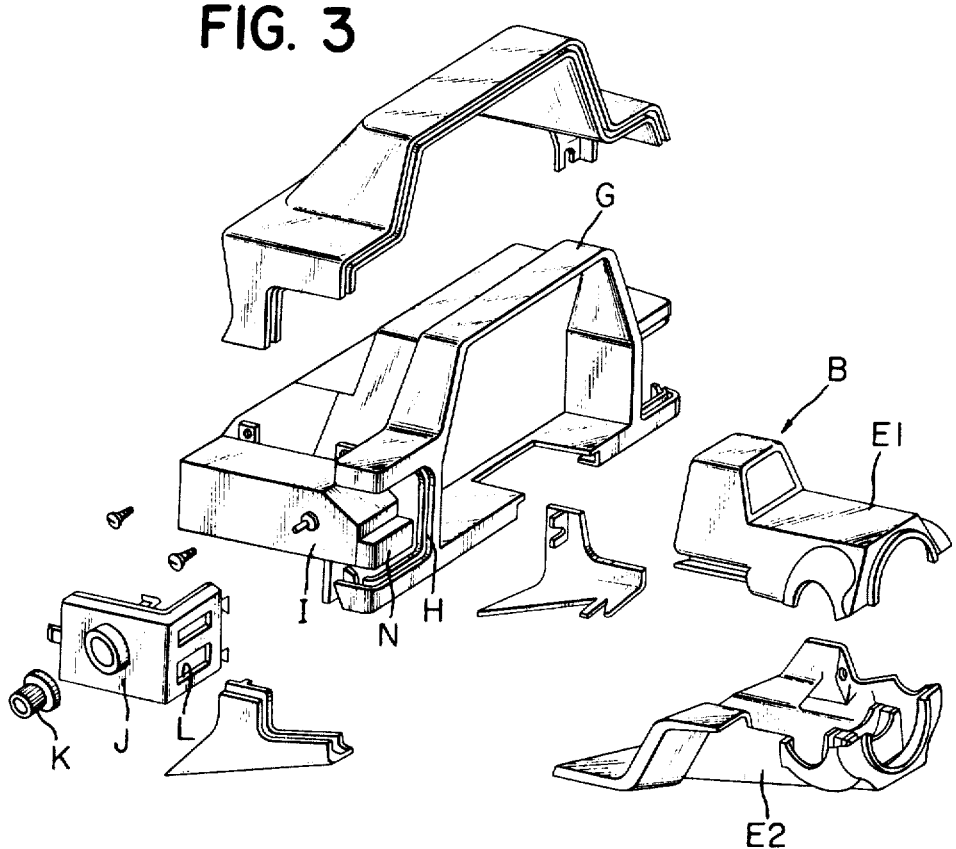
FIG. 3 is an exploded oblique view of the essential parts of the arrangement shown in FIG. 2.
Figure 4:
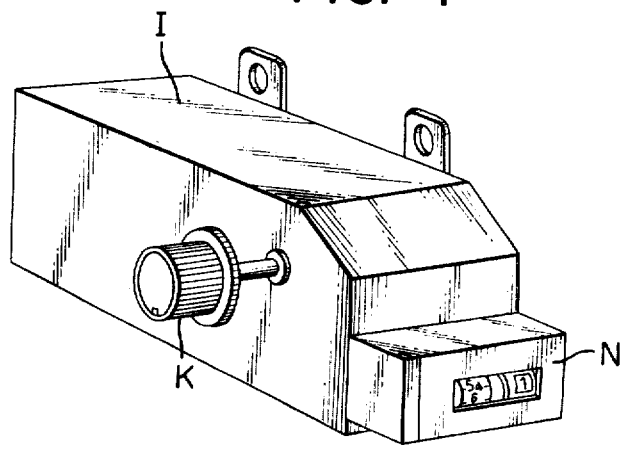
FIG. 4 is an oblique view of the radio receiver unit shown in FIG. 3.
Figure 5:
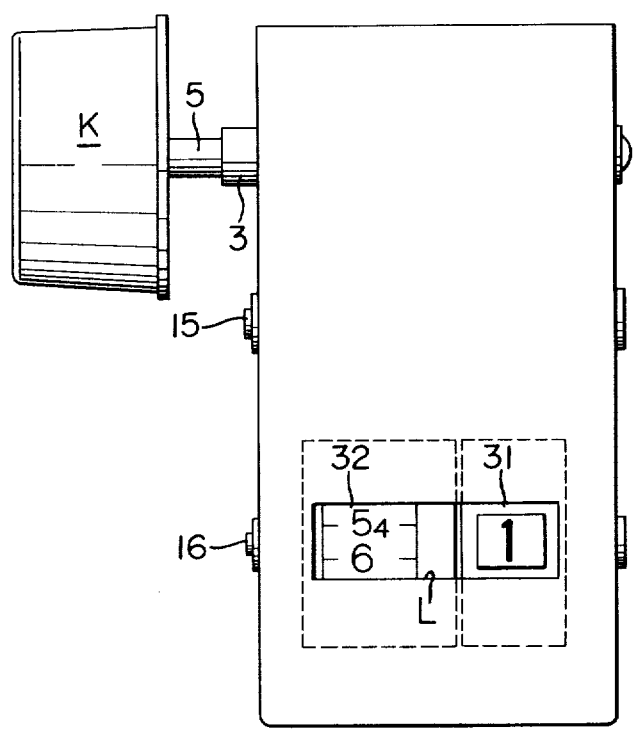
FIG. 5 is a front elevational view of the radio receiver unit including station-number and frequency indicator means arranged according to the present invention.

Referring first to FIGS. 2 to 4, which illustrate the general construction and arrangement of a radio receiving device embodying the present invention, reference character A indicates a steering shaft which extends forwardly downward through a steering column B, which is made in two, upper and lower, half sections $E_1$ to $E_2$. Reference character D indicates a steering wheel mounted on the steering shaft A at its top end.

Reference character G indicates a protruded portion of the instrument panel P provided on the vehicle in front of the driver's seat. As shown, the protruded panel portion G is formed as a housing frame forwardly of the upper half section $E_1$ of the steering column E substantially in encircling relation thereto. The housing frame or protruded panel portion G is formed in one side thereof with a laterally open recess H of U-shaped cross section to slidably receive the body of radio receiver I. Reference character J indicates a cover structure detachably secured to the outside of the receiver body.

The body of radio receiver I generally takes the form of an elongate rectangular casing frame and is provided on one side thereof with a control means K for station selection in the form of a rotary knob. Formed in the front wall of the casing frame is a through aperture of window L and, inside of which window, a station indicator drum N is mounted on a horizontal axis for rotation with the control knob K, as will be described later in detail. As indicated at O in FIG. 2, a speedometer or other instrument is arranged in the center of the front face of the protruded housing portion G of the instrument panel P.

Now, in use of the radio receiving device arranged as described above, the driver, with his hand or hands normally resting on the steering wheel D, needs only to stretch out his hand forwardly a little distance for operation of the control knob K. On this occasion, he can take the indications of indicator means N easily without the need for shifting his line of sight laterally to any substantial extent as the indicator means N is arranged in his front in substantially the same direction as the control knob K.

Description will next be made with reference to FIGS. 5 to 9, in which the station-number and frequency indicating means of the present invention, forming the control and indicator means K and N, are illustrated.

Figure 6:
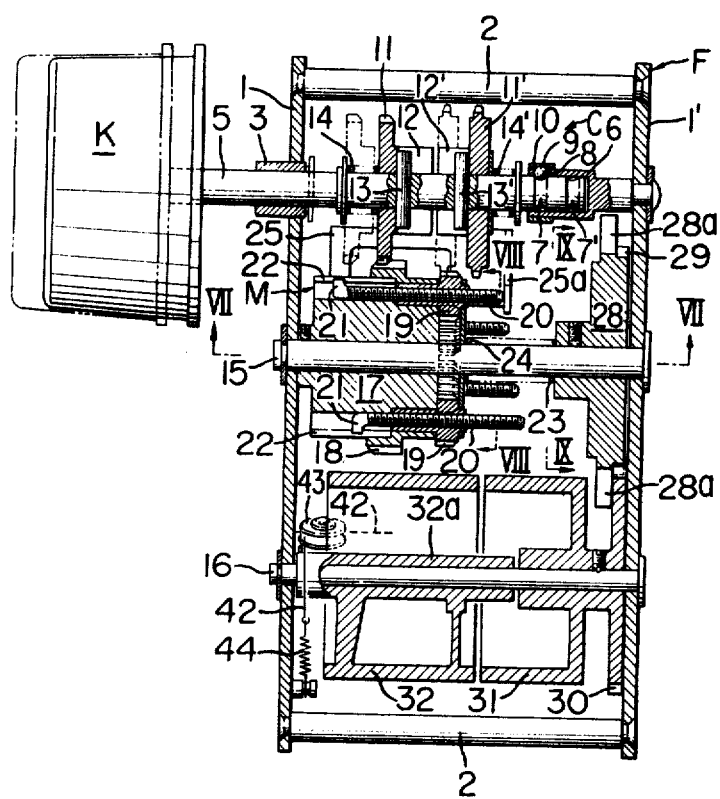
FIG. 6 is a cross-sectional front elevation of same.

Reference character F indicates a casing frame of the radio set which includes a pair of two, left- and right-hand, side plates 1, 1' arranged in spaced opposite relation to each other and a plurality of tie rods 2 interconnecting the side plates. Fixedly mounted in the left-hand side plate 1 is a tubular shaft bearing 3 by which a control shaft 5 is supported intermediate the ends thereof for rotation and axial sliding movement with a hand dial or knob K fixed to the outer end thereof. The control shaft 5 is also supported at the inner end thereof by a support sleeve 6 which is secured to the right-hand side plate 1'. Click stop means C are arranged between the control shaft 5 and support sleeve 6, including two annular restraining grooves 7, 7' formed in the control shaft 5 circumferentially around the inner end portion thereof and axially spaced from each other at a definite distance, click balls 9 held in side pockets 8, formed inside of the support sleeve 6 at the inner end thereof, for engagement with either of the annular grooves 7, 7', and an annular leaf spring 10 fitted around the outer periphery of the support sleeve 6 so as to normally urge the click balls 9 radially inwardly against the periphery of control shaft 5. With such click stop means C, the control shaft 5, which is axially slidable, assumes, when moved to the right, a first position determined by the engagement of the click balls 9 with the left-hand-side restraining groove 7, as shown in FIG. 6, and, when moved to the left, a second position determined by the engagement of the click balls 9 with the right-hand-side restraining groove 7'.

Slidably mounted on the control shaft 5 are a first and a second control gear 11 and 11' which are formed on their faces opposite to each other with bosses which extend toward each other and are formed, respectively, with diametral grooves 12 and 12' to slidably receive respective connector pins 13 and 13'. As shown, the connector pins 13, 13' are fixed to the control shaft 5 and spaced from each other at a definite distance axially thereof. With this arrangement, it will be readily understood that the two control gears 11, 11' can be turned with the control shaft 5 through the intermediary of the respective connector pins 13, 13'.

Also, the two control gears 11, 11' are normally urged toward each other under the bias of respective coiled springs 14, 14' and held in abutting engagement with the respective connector pins 13, 13' and hence at a definite axial distance from each other.

Mounted on the casing frame F in parallel with the control shaft 5 are a first and a second rotary shaft 15 and 16. Provided on the first rotary shaft 15 is a memory unit M for memorizing receive-frequencies for respective selected radio stations. The memory unit is basically of a conventional design and includes a memory drum 17 fixedly mounted on the first rotary shaft 15, a ring gear 18 formed around the outer periphery of the memory drum 17 integrally therewith, a number of pinions 19 arranged circumferentially on the right-hand end face of the memory drum 17 and each rotatably supported thereby, and threaded rods 20 threadably fitted through the respective pinions 19 and extending into respective axially extending grooves 22 formed in the periphery of the memory drum 17 circumferentially at regular intervals. Each of the threaded rods 20 is axially slidable in the associated groove 22 but is held against rotation about its own axis by means of a radially extending lug 21 formed on the threaded rod 20 at its inner end for engagement with the associated groove 22. The pinions 19 are all supported on the adjacent end face of memory drum 17 and held against any inadvertent rotation relative thereto under the pressure of a retainer plate 24, which is pressed against the set of pinions 19 under the bias of a coiled spring 23. The length of that end portion of each threaded rod 20 which extends beyond the adjacent end face of memory drum 17 can be readily adjusted by causing the associated pinion 19 to rotate about its own axis in an appropriate direction for an apropriate number of revolutions. Further, it is to be noted that the ring gear 18 is arranged so as to mesh with the first control gear 11 only when the control shaft 5 is in its first position and the second control gear 11' is arranged so as to mesh with one of the pinions 19 only when the control shaft 5 is in its second position.

Figure 7:
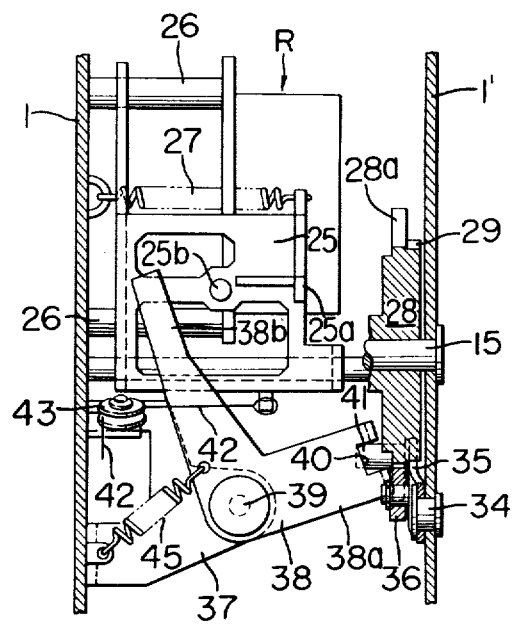
FIG. 7 is a cross-sectional view taken along the line VII—VII in FIG. 6, showing the receiving-frequency adjuster mechanism.
Figure 8:
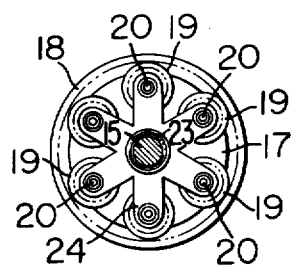
FIG. 8 is a fragmentary cross section taken along the line VIII—VIII in FIG. 6 and showing the end configuration of memory drum.
Figure 9:
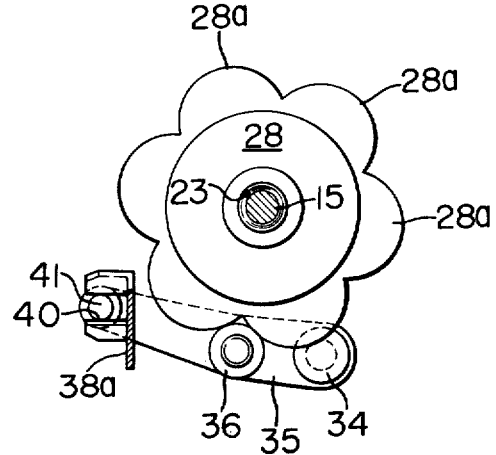
FIG. 9 is a fragmentary cross section taken along the line IX—IX in FIG. 6 and showing the cam mechanism.

A conventional form of receive-frequency adjuster unit R provided in the casing frame F, as illustrated in FIG. 7, includes a movable element or slider 25 which is slidable in a direction parallel with the first rotary shaft 15 along a guide rod 26 fixed to the casing frame F. The slider 25 has a stop lug 25a formed on one side thereof and is arranged so that the stop lug 25a is held in a position to abut against the outer end of that threaded rod 20 which is associated with one of the pinions 19 which is in a position to mesh with the second control gear 11'. A biasing spring 27 is arranged between the left-hand side plate 1 and the slider 25 so that the latter is normally held, under the bias of spring 27, in a position to maintain the stop lug 25a in abutting engagement with the adjacent threaded rod 20.

Referring to FIGS. 6 and 7, reference numeral 28 indicates a cam plate fixedly mounted on the first rotary shaft 15 for rotation with the memory drum 17. Formed on the cam plate 28 around the periphery thereof are cam lobes 28a which are the same in size and shape, corresponding in number to the pinions 17. Formed on one end face of cam plate 28 is an interlocking gear 29 which is integral therewith and is held in mesh with another interlocking gear 30, which in turn is fixedly mounted on the second rotary shaft 16. In this manner, the first and second rotary shafts 15 and 16 are interlocked with each other to rotate in opposite directions at the same ratio as that of the interlocking gears 29 and 30, which is 1:1.

Mounted on the second rotary shaft 16 are two indicator drums 31 and 32, which are closely adjacent to each other. One of the two drums, 31, carries on its peripheral surface radio station numbers as many as the pinions 19 on the memory drum 17 while the other drum 32 carries on its peripheral surface a frequency scale. The station-number indicator drum 31 is fixed to the rotary shaft 16 and the frequency indicator drum 32 is rotatably supported thereon. The casing frame 1 is formed in its front face with an indicating window L to partly expose the peripheral surfaces of the two drums 31 and 32.

As shown in FIG. 7, a rocker arm 35 is pivotally secured to the right-hand side plate 1' of casing frame F and a cam follower roller 36 is mounted on the rocker arm 35 intermediate the ends thereof for engagement with the cam profile or peripheral surface of cam plate 28. On the other hand, a bracket 37 is secured to the left-hand side plate 1 of casing frame F and to which bracket 37 a bell crank lever 38 is pivotally secured as at 39. One arm 38a of the bell crank 38 and the rocker arm 35 are operatively connected with each other by way of an engaging slot 40 formed in the free end of the crank arm 38a and an engaging pin 41 secured to the rocker arm 35 at its free end for fitting engagement with the slot 40 (see also FIG. 9). A coiled spring 45 is arranged between the side plate 1 and bell crank 38 so that the latter 38 and rocker arm 35 are normally held under the bias of spring 45 in a position to hold the cam follower roller 36 in engagement with the cam plate 28. The other arm 38b of bell crank 38 serves to actuate the slider 25 of receiving-frequency adjuster R against the bias of coiled spring 27, lying opposite to a driven pin 25b which is secured to the slider 25 and extends laterally therefrom.

Referring to FIGS. 6 and 7, reference numeral 42 indicates an interlocking cord secured at one end to the adjuster slider 25 and directed over a guide pulley 43, mounted on the left-hand side plate 1, and semicircumferentially around an axial boss 32a formed on the frequency indicator drum 32 at one end thereof. The cord 42 is connected at the other end to the casing frame F through the intermediary of a coiled spring 44. As will readily be noted, the slider 25 and frequency indicator drum 32 are operatively interconnected by means of such cord arrangement. Preferably, the cord 42 is adhesively secured to the boss 32a at an appropriate point thereon in order to prevent any slip of the cord over the boss.

Description will next be made of the operation of the embodiment described above. Assume first that the control shaft 5 is set in its first axial position with the first control gear 11 placed in mesh with the ring gear 18, as illustrated in FIG. 6. In this shaft position, when the knob K is operated to rotate the control shaft 5, the first control gear 11 acts through the ring gear 18 to rotate the memory drum 17 and cam plate 28 and the rotation of the latter is transmitted to the station-number indicator drum 31 through the interlocking gears 29-30.

As will be readily noted, as the cam plate 28 rotates, the cam follower roller 36 proceeding along the lobed profile of cam plate 28 forces the rocker arm 35 to rock against the bias of coiled spring 45, which acts upon the rocker arm through the medium of bell crank 38 and slot-pin connection 40-41, and, each time the cam follower roller 36 rides over one of the cam lobes 28a, all the associated rotating members, including the control knob K and station-number indicator drum 31, complete definite pitch of rotation. In this manner, as the control knob K is turned pitch by pitch, the station-number indicator drum 31 is also turned pitch by pitch, the station numbers thereon appearing in the indicating window L in succession one by one.

On the other hand, each time the memory drum 17 and cam plate 28 are driven to rotate a pitch distance, the rocker arm 35 causes the bell crank 38 to effect a single cycle of rocking movement and the second arm 38b of bell crank 38, striking the driven pin 25b, imparts a single reciprocatory movement to the slider 25 of receiving-frequency adjusting unit R. In the meantime, the threaded rods 20 are shifted a circular pitch distance together with the memory drum 17 about the axis thereof and that threaded rod 20 previously held opposite to the stop lug 25a of slider 25 is replaced by one of the neighboring threaded rods 20, which now serves upon engagement with the stop lug 25a to define a different position for the slider 25 to be restored under the bias of coiled spring 27. The restored position of slider 25 represents a received frequency; in other words, the frequency as just received is determined by the length of extension beyond the memory drum 17 of that threaded rod 20 which is placed opposite to the stop lug 25a for bearing engagement therewith. On the other hand, the frequency indicator drum 32, which is operatively connected with the slider 25 through the medium of interlocking cord 42, rotates with displacement of the slider 25 until that frequency marking on drum 32 which represents the received frequency determined as stated above appears in the indicating window L.

Next, in order to memorize in the memory unit M a frequency for each of the station numbers, first any desired station number on the station-number indicator drum 31 is set in place within the indicating window L while at the same time one of the threaded rods 20 which corresponds to the station number selected is brought into a position to support the stop lug 25a of slider 25. Then, the control shaft 5 is axially shifted to its second position thereby to place the second control gear 11' in meshing engagement with that pinion 19 which is associated with the threaded rod 20 now supporting the slider lug 25a while on the other hand disengaging the first control gear 11 from the ring gear 18. Subsequently, the driver properly turns the control knob K while reading through the indicating window the frequency scale provided on the frequency indicator drum 32. Rotation of control knob K is transmitted through the second control gear 11' to that pinion 19 which is in mesh therewith and, in accordance with the direction and amount of rotation of this pinion 19, the length of extension beyond the adjacent memory drum end face of the associated threaded rod 20 and hence the rest position of the slider 25 of receiving-frequency adjusting means R are adjusted so that the desired frequency and radio station are selected. In this manner, the radio station is memorized in the memory unit M as the extension length of the corresponding threaded rod 20. It will be apparent that all the radio stations can be readily memorized by repetition of the memory operation described above.

When, in the above operation, the control shaft 5 is shifted, for example, from its first to second axial position, if the second control gear 11' comes into collision with the adjoining pinion 19 because of their relative angular position precluding meshing engagement of their teeth, the control shaft 5 continues to slide axially to the left, leaving the second control gear 11' in abutting engagement with the pinion 19 while compressing the coiled spring 14' against the latter, and reaches the second axial position to be held thereat under the action of click stop means C. During this time, the connector pin 13' on the control shaft 5 remains held in sliding engagement with the groove 12 formed in the boss portion of second control gear 11'. Subsequently, when the control knob K is turned to rotate the second control gear 11' through the medium of the connector pin 13', the second control gear 11' is immediately brought into normal meshing engagement with the pinion 19 under the bias of coiled spring 14' as soon as the teeth on the control gear 11' are shifted for sliding fit with those on the pinion 19. Similarly, the control shaft 5 can be shifted axially to the right from its second position in a continuous fashion until it reaches its first position even if the first control gear 11 first comes into collision with the adjoining pinion 19. The first control gear 11, even if held once in abutting engagement with the pinion 19, is allowed to mesh therewith automatically under the bias of the associated coiled spring 14 subsequently when the control knob K is started to rotate.

In either case, it is to be noted that the control shaft 5 once shifted into its first or second axial position is resiliently held against any inadvertent axial movement by the click stop means C even after the control knob K has been released and this makes it particularly easy for the operator to change his grip on the knob in order to turn the latter for station selection or receive-frequency adjusting operation. It will be readily observed that the coiled springs 14, 14' serve as cushioning means effective to prevent the associated gears and pinions from being unduly strained even when brought into collision with each other and any damage to these gears and pinions is effectively avoided.

To summarize, the radio receiving device of the invention includes station-number and frequency indicator drums 31, 32 rotatably mounted on a common shaft and operable independently from each other. The two drums 31, 32 are operatively connected respectively with memory unit M and receive-frequency adjuster element 25, which is associated with the memory unit M. The station numbers selected and corresponding received frequencies on the peripheral surfaces of the respective drums 31, 32 are indicated through a window opening L formed in the front face of the radio casing so as to be readily taken at a glance, thus enabling rapid and accurate station selection. It will be readily appreciated that such radio receiving device is particularly advantageous for automotive use in which a high degree of visibility of station and frequency indications is required.

What is claimed is:

1. A radio receiving apparatus for automotive use comprising: an instrument panel in front of the driver's seat having a protruding portion formed in the vicinity of the steering wheel, station-number and frequency indicating means arranged in said protruding portion of said instrument panel for displaying a specified frequency corresponding to each of a plurality of presetted station numbers, control means arranged on one side of the protruding portion for selecting a desired station number and indicator means arranged in the front face of the protruding portion for indicating a station number and corresponding frequency as selected by said control means.

2. A radio receiving apparatus as set forth in claim 1, wherein: said control means are of a rotary type including a rotary knob or the like, for a rotary control member.

3. A radio receiving apparatus as set forth in claim 1, wherein: said indicator means are of the rotary type including a rotary drum or the like, for a rotary indicating member.

4. A radio receiving apparatus as set forth in claim 1, wherein: said indicating means comprises: a station-number indicator drum rotatable mounted on a rotary shaft having a set of radio station numbers on the peripheral surface thereof, a frequency indicator drum fixedly mounted on said rotary shaft having a frequency scale on the peripheral surface thereof, an indicating window formed in the radio casing frame to form indicating surfaces of said indicator drums partly visible therethrough, memory means operatively connected with said station-number indicator drum and operable to memorize the receiving-frequencies corresponding to the respective station numbers as carried on said station-number indicator drum to appear in said indicating window, a receiving-frequency adjusting unit, including a movable element operable by said memory means in parallel with the axis thereof and operatively connected with said frequency indicator drum in a manner so that the frequency indicia on the latter which corresponds to any definite receiving frequency memorized in said memory means appears in said indicating window.

5. A radio receiving apparatus as set forth in claim 4, wherein: said indicating means further includes a control shaft rotatably supported on the radio casing frame and slidable relative thereto, between a first position and a second position axially spaced therefrom, said control shaft being provided thereon with said control means in the form of a rotary knob, and a first and a second control gears mounted on said control shaft being axially spaced apart from each other; said memory means including a support shaft rotatably mounted on the radio casing frame in parallel to said control shaft, a memory drum fixedly mounted on said support shaft, a ring gear formed integrally around the outer periphery of said memory drum therewith, a plurality of pinions rotatably supported on said memory drum and arranged circumferentially along one end face thereof, threaded rods threadably fitted through said respective pinions axially thereof, extending slidably but non-rotatably into said memory drum, and a stop lug formed on said movable element of said receiving-frequency adjusting unit positioned to abut against the outer end of the threaded rod associated with one of said pinions which is positioned for meshing engagement with said second control gear; the arrangement being such that, when said control shaft is in said first position, said first control gear is placed in mesh with said ring gear, thus enabling said memory drum and said support shaft to rotate with rotation of said control shaft, causing rotation of said rotary shaft and said frequency indicator drum through the medium of a pair of meshing gears fixedly mounted on said support shaft and said rotary shaft, respectively, and that, said first control gear is disengaged from said ring gear when said control shaft is placed in mesh with one of said pinions, thus enabling the latter to rotate with rotation of said control shaft thereby to move said threaded rod associated with said one of said pinions axially relative to said memory drum and the length of extension beyond the latter of said threaded rod is adjusted.

6. A radio receiving apparatus as set forth in claim 5, which further comprises: a cam plate fixedly mounted on said support shaft and having a set of cam lobes of the same size and shape formed around the outer periphery of said cam plate, corresponding in number to said pinions; a rocker arm pivotally secured to the radio casing frame, provided at the free end thereof with an engaging pin; a cam follower roller mounted on said rocker arm intermediate the ends thereof, for engagement with the lobed profile of said cam plate; a bell crank lever pivotally secured to the radio casing frame, including a first arm formed at the free end thereof with an engaging slot for engagement with said engaging pin and a second arm lying opposite to a driven pin secured to said movable element of said receiving-frequency adjusting unit, operable to drive the latter through the medium of said driven pin; and means for biasing said bell crank lever in a direction to hold said engaging slot in engagement with said engaging pin.

7. A radio receiving apparatus as set forth in claim 6, further comprising; click stop means arranged between said control shaft and the casing frame, to resiliently hold said control shaft in either one of said first and second positions, spring means for biasing said first and second control gears respectively into a position to mesh with said ring gear and a position to mesh with said one of said pinions.

* * * * *